Oct. 12, 1965  W. W. WARD  3,210,785
FISHING ROD RETRIEVER
Filed June 5, 1964
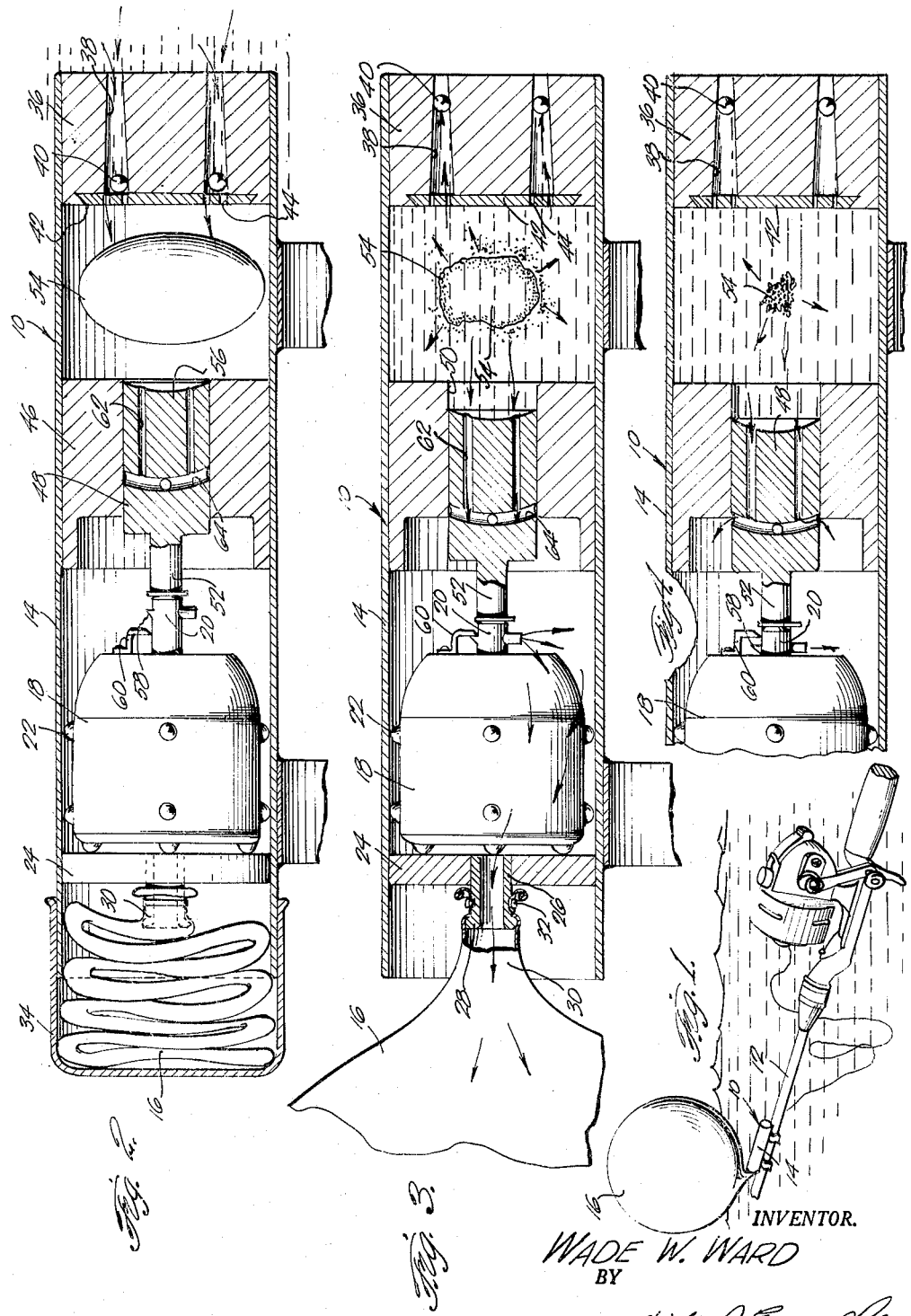
INVENTOR.
WADE W. WARD
BY

3,210,785
FISHING ROD RETRIEVER
Wade W. Ward, 1912 Ohio Ave., Parkersburg, W. Va.
Filed June 5, 1964, Ser. No. 372,787
2 Claims. (Cl. 9—9)

The present invention generally relates to a fishing rod float and more particularly to such a float that is attached to a fishing rod for automatically raising the fishing rod to the surface of a body of water in the event the fishing rod is accidentally dropped into the water.

Devices for floating fishing rods have heretofore employed a puncturable cartridge of carbon dioxide or other pressurized gas together with a device for puncturing the cartridge which is triggered in response to water pressure or dissolution of a retainer which releases the puncturing mechanism. While the prior art devices operate to a degree, it is the primary object of this invention to provide a float including an inflatable member, a pressurized container, an actuating mechanism for releasing the contents of the container and a novel means for operating the actuating mechanism in response to entry of water into the float device.

Another object of the present invention is to provide a fishing rod float which includes a gas producing mechanism for releasing the contents of the pressurized container and subsequently assisting in inflating the float member.

A further object of this invention is to provide a fishing rod float which is simple in construction, easy to attach, easy to recondition for reuse, dependable, efficient and relatively inexpensive to manufacture.

The foregoing and other objects, features and advantages of the invention will be apparent from the following more particular description of a preferred embodiment of the invention, as illustrated in the accompanying drawings.

FIGURE 1 is a perspective view of the fishing rod float in operative use;

FIGURE 2 is a longitudinal sectional view of the float in collapsed condition;

FIGURE 3 is a sectional view similar to FIGURE 2 with the float partially inflated; and FIGURE 4 is a fragmental sectional view illustrating the final step in inflating the float.

Referring now specifically to the drawings, the numeral 10 generally designates the float of the present invention that is attached to a fishing rod 12 in any suitable manner and in any desired location.

The float 10 includes a tubular housing 14 with an inflatable balloon 16 disposed in one end thereof when in collapsed condition. A container 18 for a pressurized gas such as carbon dioxide is mounted in the housing 14 and is provided with a discharge valve 20 which is normally closed and which is opened by longitudinal inward movement.

The container 18 has a plurality of knobs 22 thereon frictionally retaining the same within the casing and slightly spaced from a partition wall 24 which has a central tubular sleeve 26 therein. The sleeve 26 projects beyond the wall 24 and terminates in a peripheral lip 28 which receives the neck 30 of the balloon 16. The neck 30 of the balloon is retained over the lip 28 by a resilient band 32 or other suitable band thus communicating the interior of the casing 14 with the balloon 16. The balloon 16 is retained in folded uninflated condition by a pop-off cap 34 telescoped over the end of the casing 14 as illustrated in FIGURE 2.

At the end of the casing 14 opposite from the cap 34, there is provided a plug 36 having water inlet passages 38 each having a diverging cross-sectional area from the outer surface to the inner surface thereof. Each bore 38 has a ball valve 40 therein which serve as check valves which admit water but which will prevent egress of fluid pressure as illustrated in FIGURE 3. The ball valves 40 are retained in the bores 38 by a retainer plate 42 having apertures 44 smaller than the ball valves 38 for retaining the same in place.

Spaced inwardly from the plug 36, a plug 46 is provided which has a piston 48 slidable in a bore 50 therein. The piston 48 has an axial extension 52 thereon which abuts against the end of the valve 20 on the container 18 for opening the same upon inward movement of the piston 48.

A gas producing material 54 is disposed between the plugs 36 and 46 and when water comes into contact therewith, a gas is produced for closing the ball valves 40 and moving piston 48 by engaging the concave end 56 thereof for opening the container 18. The valve 20 has a lug 58 thereon for engagement by a catch 60 on the container 18 for retaining the valve 20 open once the piston 48 has opened the valve 20. The gas producing material may be replaced and may be a capsule of carbide or equivalent material.

The piston 48 is provided with a plurality of longitudinal passages 62 communicating with the concave surface 56 and a transversely curved passage 64 which communicates with the space inwardly of plug 48 when the piston 48 is at its innermost point. Thus, gas pressure produced by material 54 serves not only to open the container 18 but also to assist in inflating the balloon as illustrated in FIGURES 2 and 3.

The device may be constructed of plastic, metal or the like and may be built in or attached to a fishing rod or other articles likely to become immersed in water.

While the invention has been particularly shown and described with reference to a preferred embodiment thereof, it will be understood by those skilled in the art that various changes in form and details may be made therein without departing from the spirit and scope of the invention.

I claim:

1. A float adapted to be used in combination with equipment subject to being immersed in water comprising a tubular casing, an inflatable member disposed in said casing when uninflated and forced outwardly thereof when inflated, said member being connected to said casing, a pressurized container disposed in said casing and having a container valve, means movably disposed in said casing for opening said container, means communicating with the container and member for inflating the same when the container is opened, and means within said casing to actuate said movable means in response to entry of water in the casing, said movable means including a piston slidable in said casing for engaging and opening the container valve, said container valve and container including means for retaining said valve in open position once it has moved thereto, said means for actuating the piston including a quantity of gas-producing materials in said casing for producing a gas when water comes into contact therewith.

2. The float as defined in claim 1 wherein said piston includes normally closed passages therein, said passages permitting passage of gas pressure into the balloon for assisting in the inflation thereof when the piston is moved to its fully inner position.

References Cited by the Examiner
UNITED STATES PATENTS

| 2,853,724 | 8/58 | Smith | 9—9 |
|---|---|---|---|
| 2,938,488 | 5/60 | Hathaway | 9—9 X |
| 3,123,842 | 3/64 | Oeland et al. | 9—9 |

MILTON BUCHLER, *Primary Examiner.*

FERGUS S. MIDDLETON, *Examiner.*